United States Patent
Klaus-Nietrost et al.

(10) Patent No.: US 11,952,714 B2
(45) Date of Patent: Apr. 9, 2024

(54) PROCESS FOR SEPARATING A FIBROUS TARGET COMPONENT FROM TEXTILE WASTE

(71) Applicant: LENZING AKTIENGESELLSCHAFT, Lenzing (AT)

(72) Inventors: Christoph Klaus-Nietrost, Vöcklabruck (AT); Richard Herchl, Ried im Innkreis (AT); Christian Weilach, Vöcklabruck (AT)

(73) Assignee: LENZING AKTIENGESELLSCHAFT, Lenzing (AT)

( * ) Notice: Subject to any disclaimer, the term of this patent is extended or adjusted under 35 U.S.C. 154(b) by 556 days.

(21) Appl. No.: 16/961,732

(22) PCT Filed: Jan. 14, 2019

(86) PCT No.: PCT/EP2019/050775
§ 371 (c)(1),
(2) Date: Jul. 13, 2020

(87) PCT Pub. No.: WO2019/138101
PCT Pub. Date: Jul. 18, 2019

(65) Prior Publication Data
US 2021/0062417 A1 Mar. 4, 2021

(30) Foreign Application Priority Data

Jan. 15, 2018 (EP) .................................. 18151737

(51) Int. Cl.
*B03B 5/34* (2006.01)
*B03B 9/06* (2006.01)
*D21C 5/00* (2006.01)

(52) U.S. Cl.
CPC .................. *D21C 5/00* (2013.01); *B03B 5/34* (2013.01); *B03B 9/061* (2013.01)

(58) Field of Classification Search
CPC .............. D21C 5/00; B03B 5/34; B03B 9/061
See application file for complete search history.

(56) References Cited

U.S. PATENT DOCUMENTS

| 3,941,688 | A | | 3/1976 | Saitoh et al. |
| 4,040,949 | A | * | 8/1977 | Saitoh ...................... B03D 1/02 |
| | | | | 209/166 |

(Continued)

FOREIGN PATENT DOCUMENTS

| WO | 97/21490 A2 | 6/1997 |
| WO | 03/035963 A2 | 5/2003 |

(Continued)

OTHER PUBLICATIONS

English Translation of WO 2013/182801; Inv: Charbonnier; Date: Dec. 2013 (Year: 2013).*
International Search Report and Written Opinion issued in counterpart PCT Application No. PCT/EP2019/050775 (8 pages), dated Feb. 2019.

*Primary Examiner* — Joseph C Rodriguez
(74) *Attorney, Agent, or Firm* — Venable LLP (57) ABSTRACT

A process (1, 101, 201) for separating a fibrous target component (21) from textile waste (2, 5) is shown, said textile waste (2, 5) containing the target component (21) and at least one ancillary component (22), whereby the target component (21) consists of water-swellable textile fibers (51) with a density higher than the density of water, the process (1, 101, 201) comprising the steps: a) dispersing the comminuted textile waste (5) in an aqueous solution (7) to obtain a suspension (8) containing the textile waste (5), and b) separating the dispersed textile waste (5) into a high-density target fraction (81) comprising the target component (21), and a low-density residual fraction (82) comprising the at least one ancillary component (22), according to the (Continued)

respective density of said components (21, 22). In order to provide a reliable, fast process for the separation of water-swellable fibers from other textile fibers which are similar in density, it is proposed, that the aqueous solution (7) is an alkaline aqueous solution (7) and the target component fibers (51) are swelled in the alkaline aqueous solution (7) prior to step b), thereby increasing the density and weight of said target component (21) relative to the density and weight of the ancillary component (22).

25 Claims, 3 Drawing Sheets

(56) References Cited

U.S. PATENT DOCUMENTS

| | | | | |
|---|---|---|---|---|
| 4,440,635 | A * | 4/1984 | Reiniger | D21B 1/322 |
| | | | | 241/86.1 |
| 9,353,476 | B2 * | 5/2016 | Henriksson | D21B 1/32 |
| 10,501,599 | B2 * | 12/2019 | Barla | C08L 1/02 |

FOREIGN PATENT DOCUMENTS

| | | | | |
|---|---|---|---|---|
| WO | WO-2013124265 A1 * | 8/2013 | | C08B 16/00 |
| WO | 2013/182801 A1 | 12/2013 | | |
| WO | WO-2018104330 A1 * | 6/2018 | | D01F 2/02 |

* cited by examiner

PROCESS FOR SEPARATING A FIBROUS TARGET COMPONENT FROM TEXTILE WASTE

The present application is a national-stage entry under 35 U.S.C. § 371 of International Patent Application No. PCT/EP2019/050775, published as WO 2019/138101 A1, filed Jan. 14, 2019, which claims priority to EP 18151737.6, filed Jan. 15, 2018, the entire disclosure of each of which is hereby incorporated by reference.

BACKGROUND OF THE INVENTION

Technical Field

The invention relates to a process for separating a fibrous target component from textile waste, said textile waste containing the target component and at least one ancillary component, whereby the target component consists of water-swellable textile fibers with a density higher than the density of water, the process comprising the steps: a) dispersing the comminuted textile waste in an aqueous solution to obtain a suspension containing the textile waste, and b) separating the dispersed textile waste into a high-density target fraction comprising the target component, and a low-density residual fraction comprising the at least one ancillary component, according to the respective density of said components (21, 22).

Background Art

Cellulosic fibers in post-consumer textile wastes are almost always accompanied by synthetic man-made fibers, such as polyester, nylon or elastane. The reclaiming of cellulosic fibers (i.e. cotton, Viscose, Modal or Lyocell) from such mixtures is a complex and difficult task. In particular, cellulosic fibers are prone to degradation in harsh chemical environments, rendering their use in processes for production of man-made cellulosic fibers unsuitable. Mechanical separation of these fibers on the other hand is very difficult due to the small density difference of the fiber species and other nearly identical physical properties. Thus, the required selectivity of the separation cannot be achieved in state-of-the art separation methods.

In the state-of-the-art, processes are known for separating cellulosic fibers from polyester-blends by selectively dissolving the cellulosic fibers. E.g. in WO 2003/035963 A2, a solution of NMMO and water is used to dissolve the cellulosic fibers. Although in such processes cellulosic fibers can be selectively reclaimed from mixtures, the cellulosic fibers degrade during the dissolution and are not suitable as a starting material for the production of man-made cellulosic fibers.

In WO 2013/182801 A1 a process for separating polyester and cotton fibers from textile waste is disclosed, in which said polyester and cotton fibers are intimately mixed. Therefore, the textile waste is grinded and dispersed in water to obtain a suspension containing said fibers. The suspension is stirred, whereby the cotton fibers soak up a quantity of the water and their weight is increased. In a subsequent process step, the polyester and cotton fibers are separated in a flotation process, whereby the lighter polyester fibers accumulate on top of the suspension. Although such mild process conditions are preferable to reclaim cellulosic fibers in good quality, such processes may hardly be suitable to reclaim the cellulosic fibers from the polyester fibers, since only a low selectivity can be obtained due to the very small density difference between the cotton fibers and polyester fibers. If such a process would be applied to reclaim cotton, this usually results in either a huge loss of cotton during the separation or a high contamination of the cotton with polyester. Furthermore, such processes have the disadvantage of long process times due to the slow soaking and flotation steps, which ultimately limit the process throughput.

In WO 97/21490 A2, a process for recycling of textile waste is disclosed, wherein a face fiber is separated from other solid components with a different density than the face fibers, such as adhesives and solid particles. The waste mixture is dispersed in an aqueous solution and said solution is passed through a hydrocyclone to separate the mixture into a fraction of face fibers and a fraction of other solid components according to their density. Although such processes are suitable to separate fibrous components from solid particles, they may not be applied for the separation of different fiber species with similar density due to their low selectivity.

DISCLOSURE OF INVENTION

Thus, it is an object of the present invention to provide a reliable, fast process for the separation of water-swellable fibers from other textile fibers, which are nearly similar in density.

The stated object is inventively achieved in that the aqueous solution is an alkaline aqueous solution and the target component fibers are swelled in the alkaline aqueous solution prior to step b), thereby increasing the density and weight of said target component, more particularly of the target component fibers, relative to the density and weight of the ancillary component.

If the aqueous solution is an alkaline aqueous solution and the target component, i.e. the target component fibers are swelled in said alkaline aqueous solution prior to step b), a simple and reliable process step for increasing the density and weight of the target component, i.e. the target component fibers, can be obtained. By selectively increasing the density of the target component fibers, the density difference between target and ancillary component fibers is increased, giving rise to a more reliable and robust separation process with a better selectivity for separation of the components according to their respective density. Common processes of swelling fibers in water or saline solutions may on the one hand increase the weight of these fibers, but on the other hand have the disadvantage, that the density of the fibers is lowered due to the lower density of the solution. Contrary, the alkaline environment in the aqueous solution helps to efficiently swell the cellulose molecules by incorporating heavier alkaline ions into the fibrous structure of the target component fibers, thereby leading to an increase in density of said fibers.

In general, high-density target fraction in the sense of the present invention refers to a fraction of fibers to be reclaimed from the textile waste, where the average density of said target fraction fibers is higher than a density threshold value. In the same manner, low-density residual fraction in the sense of this invention refers to a fraction of fibers to be rejected in the separation, where the average density of said residual fraction fibers is lower than the density threshold value. The density threshold value is thus lower than the average density of the target component fibers and higher than the average density of the ancillary component fibers.

It is further generally mentioned, that after the separation process, the target component content in the target fraction is higher than the target component content in the textile waste as provided and the ancillary component content in the target fraction is lower than the ancillary component content in the textile waste as provided, whereby the component contents are measured in reference to the total solid component weight of the fractions (without solution).

If, after dispersion of the comminuted textile waste in the aqueous solution, the suspension contains the textile waste in an amount of 0.3% to 6% by weight, the suspension may easily be handled and processed throughout the whole recycling process. If the suspension contains the textile waste in an amount of 3% to 5% by weight, reliability and efficiency of the process may be further improved.

The above-mentioned advantages apply in particular to target component fibers that belong to the group of cellulosic fibers. Cellulosic fibers typically have a density in the order of 1.45 g/mL to 1.60 g/mL and a high swelling capacity compared to non-cellulosic fibers. In particular regenerated cellulosic fibers have the highest swelling capacity among them, enabling a significant increase of density due to the swelling. Such regenerated cellulosic fibers may be for example Rayon-, Lyocell- or Modal-fibers. Also, the present invention can be successfully applied for reclaiming cotton fibers from textile waste. Besides their high water retention capacity, cellulosic fibers can be attacked by the alkaline solution in that the hydrogen bonds between the cellulose molecules of the cellulosic fibers can be opened up and hence ions of the alkaline solution can be incorporated into the cellulose chains. Thereby, the density of the cellulosic fibers is increased, improving the suitability for separation. Thus, the selectivity and reliability of the inventive process can be further improved.

The above-mentioned advantages apply in particular, if the density of the water-swellable target component fibers is at least 1.45 g/mL. Fibers with a density higher than 1.5 g/mL exhibit a sufficiently high density in order to be reliably separated from relevant ancillary components after swelling.

In general, it is mentioned, that in the context of this invention, density refers to the volumetric mass density of the respective substance.

The inventive process may be further improved if the ancillary component consists of textile fibers which are substantially non-swellable in water, with a density lower than the density of the target component fibers. In particular, if the fibers are not swellable in water, there will be substantially no increase in density of the ancillary component fibers due to the swelling. Furthermore, if the density of said ancillary component fibers is lower than the density of the target component fibers, the selectivity of the process can be further improved. In a preferable embodiment of this invention, the ancillary component fibers may be synthetic non-cellulosic fibers, such as e.g. polyester-, polyamide-, polypropylene-, or polyurethane-fibers. Such fibers usually need to be removed in cellulosic fiber recovery, because they increase the organic load of the effluent streams. Thus, if the inventive process is applied to textile wastes with such ancillary components, the overall chemical consumption of the recycling process may be drastically improved, resulting in a more economically and environmentally friendly process.

The inventive process may also be advantageously insensitive regarding contaminations, in particular if the textile waste comprises non-fibrous scrap, more particularly from rubber, leather, plastics or metal. Such scrap can be easily separated in said process without diminishing the quality of separation. Thus, a process with a high insusceptibility to pollution of the textile waste may be supplied.

The aforementioned advantages can be further improved, if the target component fibers are swelled in an alkaline aqueous solution with a pH between 9 and 12. Such alkaline aqueous solution may easily be produced prior to dispersing the textile waste by adding an alkali hydroxide in such an amount to the aqueous solution, that a pH between 9 and 12 is obtained. Suitable alkali hydroxides may be for example caustic soda. If an alkaline solution with a pH between 9 and 12 is used, the chemical consumption of a subsequent alkaline cooking step, and thus of the whole recycling process, may be reduced, since the treatment of the textile waste in the alkaline solution serves as a first alkaline pre-treatment process prior to further alkaline treatment (e.g. said subsequent alkaline cooking process).

If further the target component fibers are swelled in the alkaline aqueous solution until the difference in density between the target component and the ancillary component is higher than 0.15 g/mL, a high selectivity allowing a reliable separation of the fibers is obtained. The selectivity may be even further improved, if the density difference is more particularly higher than 0.2 g/mL, even more preferably higher than 0.25 g/mL. Process cycle times may thus be reduced due to the higher selectivity, enabling a higher process throughput.

If the target component fibers are swelled in the alkaline aqueous solution at a temperature between 5° C. and 60° C., the efficiency of the swelling step can be improved. Even higher efficiency of the swelling may be obtained at temperatures between 20° C. and 57° C., more preferably between 35° C. and 55° C. Hence, the swelling step of the process may be accelerated, thereby further reducing the process cycle times.

The selectivity of the separation according to the inventive process can be further improved if the dispersed textile waste is separated according to the respective density of the components. Due to the swelling in the alkaline aqueous solution the density of the target component fibers is increased, thus, allowing for a reliable separation of said components. Thereby, the removal efficiency of the ancillary component in the target fraction can be at least 30%, more particularly even at least 40%. Hence in a suspension initially containing 70% of target component fibers by weight of solids, the resulting target fraction may contain at least 75-80% target component fibers by weight of solids. The removal efficiency is thereby considered as the percentage of the absolute mass of the ancillary component in the textile waste that has been removed from the target fraction and rejected to the residual fraction.

Such separation of the components in the dispersed textile waste according to their respective density in step b) of the inventive process can be performed via at least one mechanical separation device. Mechanical separation devices in the sense of this invention are preferably based on centrifugal or gravitational force, which are sensitive to differences in density and/or weight. Such devices may be for instance a hydrocyclone or a centrifuge. A hydrocyclone is a separation device that sorts particles in a liquid suspension based on the ratio of their centripetal force to fluid resistance. This ratio is high for dense particles, and low for light particles. It has one inlet, one underflow outlet at the bottom and one overflow outlet at the top. The underflow generally receives the high-density fraction, while the overflow receives the low-density fraction. Internally, inertia is countered by the resistance of the liquid, with the effect that larger or denser particles are transported to the wall for eventual exit at the underflow side with a limited amount of liquid, while the finer, or less dense particles, remain in the liquid and exit at the overflow side through a tube extending slightly into the body of the cyclone at the center. Additionally, or alternatively, a separation according to the density of the components may also be performed by a flotation separation device. The flotation may be further supported by a suitable surfactant and/or flotation agent (e.g. a non-ionic tenside). A suitable flotation method would be for example dissolved air flotation (DAF).

A separation process with a particular high selectivity may be provided if the target fraction is subsequently passed to a second separation device. The second separation step may thereby use the same kind of separation device or a complementary separation device than in the first separation step. In one embodiment for example, the first separation step may employ a hydrocyclone and the second separation step a flotation device, or vice versa. In another embodiment, the separation may be performed by a cascade of 3-5 hydrocyclones. Likewise, any other combination of separation devices according to this invention may be used.

If the textile waste is comminuted, more particularly to a size between 0.5 mm and 3 mm, prior to step a), a more reliable process may be provided. In particular, through the comminution, it can be ensured that the target component fibers are individually present in the suspension after step a). The individual accessibility of the fibers in the suspension is very important to allow for a component-selective separation. Additionally, an average size between 0.5 mm and 3 mm in terms of length is preferable to reduce the formation of aggregates or clogs and to improve the homogeneity of the suspension. Thus, a process with high reliability may be provided.

The homogeneity of the suspension may be further improved, if the textile waste is comminuted such that the target component fibers and the ancillary component fibers are substantially in the same size range. Furthermore, adverse effects that depend on the size of the comminuted fibers (such as friction and buoyancy) can be reduced if all components exhibit fiber sizes in a similar range, thus improving the quality of separation.

The dispersion of the components in the alkaline aqueous solution can be improved, if a surfactant agent, more particularly from the group of non-ionic tensides, is added to the alkaline aqueous solution. A more homogeneous solution may therewith be provided. If the surfactant agent is added in a concentration ≤2% by weight a reliable, yet cost-effective process can be provided.

The process according to the present invention may also be particularly advantageous when it is used in the pulping of cellulose-based raw material from textile waste for the production of dissolving pulp. Dissolving pulp must meet high demands in terms of purity and degree of polymerization (DP-value) to be suitable for the production of molded cellulosic bodies. Textile waste usually contains a large number of contaminants that need to be removed thoroughly before a suitable dissolving pulp can be obtained therefrom. If a process according to any of claims 1 to 9 is used for reclaiming cellulosic raw material from textile waste, a dissolving pulp can be produced in very high purity without degrading the DP-value of the cellulosic raw material. Such a dissolving pulp may even meet the very high standards to be suitable for the production of cellulosic molded bodies of the Lyocell-type.

If a target fraction containing a fibrous textile target component is separated from textile waste in a process according to any of claims 1 to 9, and the target fraction after separation, preferably containing the alkaline aqueous solution, is subjected to an alkaline cooking process to remove residual contaminants in order to obtain the dissolving pulp, a preferred synergetic effect can be obtained: since the textile waste is already dispersed in an alkaline solution, the consumption of chemicals in the subsequent cooking process can be greatly reduced, resulting in an overall more cost-efficient and more economically friendly process.

Finally, the pulp may be washed and bleached prior to obtaining the dissolving pulp, to remove any residual alkaline solution.

The inventive process according to any of claims 1 to 9 may also advantageously be used in the production of regenerated cellulosic molded bodies from, cellulosic fibers are recovered from textile waste and the regenerated cellulosic molded bodies may subsequently be produced from said recovered fibers.

Thereby a dissolving pulp from textile waste may be obtained according to any of claims 10 to 13 and subsequently dissolved in a suitable solvent to form a spinning solution and said spinning solution is extruded through a spinneret and precipitated in a spin bath to obtain the cellulosic molded bodies. For instance, in the case of a Lyocell-process, such suitable solvent may more particularly contain water and a tertiary amine oxide.

BRIEF DESCRIPTION OF THE DRAWINGS

In the following, the invention is exemplified based on embodiments with reference to the drawings. In particular

MODES FOR CARRYING OUT THE INVENTION

Figure 1:
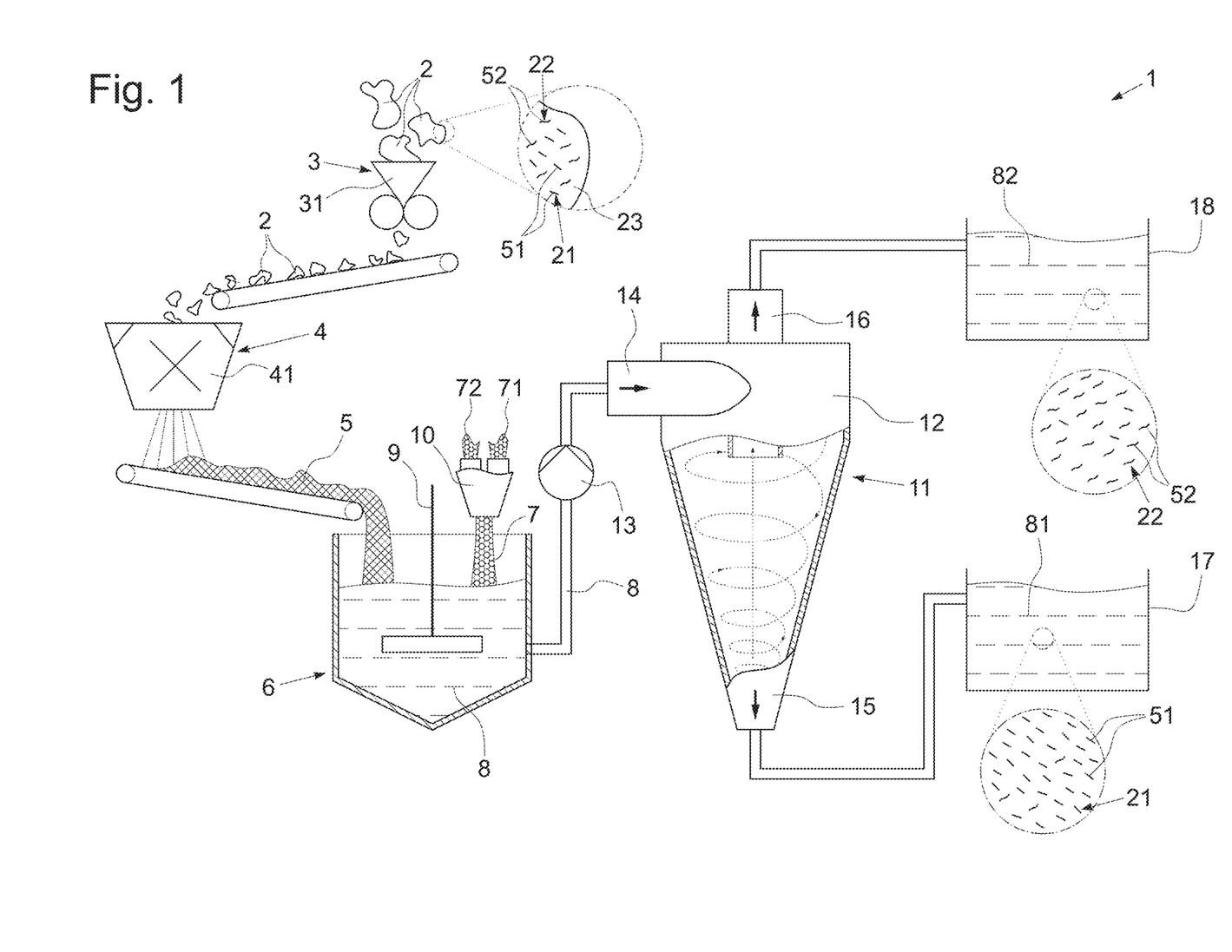
FIG. 1 shows a partially sectional schematic view of a first embodiment according to the inventive process with a single hydrocyclone separation device.

In FIG. 1, a process 1 according to a first embodiment of the invention is schematically depicted. Thereby, a textile waste 2 containing a target component 21 and an ancillary component 22 is comminuted in a first comminution device 3 and optionally a second comminution device 4, to obtain a comminuted textile waste 5. The first and second comminution devices 3, 4 may be for instance a guillotine 31 and a cutting mill 41, respectively, although other similar comminution devices 3, 4 may also be used. The target component 21, which shall be reclaimed from the textile waste 2, 5, contains at least one cellulosic fiber 51, preferably cotton, and the ancillary component 22, which shall be rejected from the textile waste 2, 5, contains at least one synthetic fiber 52, such as polyester or elastane. However, the target component 21 may also contain one or multiple types of regenerated cellulosic fibers 51, such as viscose-, Lyocell- or Modal-fibers, whereas the ancillary component 22 may also contain multiple types of non-cellulosic man-made fibers 52 such as (non-exclusive) polyester-, polyamide-, acrylic-, or elastane-fibers, which was not further shown in FIG. 1. The different fibers 51, 52 of the components 21, 22 are usually intimately intertwined in the textile waste 2, e.g. in the form of a fabric 23. The comminuted textile waste 5 has a size between 0.5 mm and 3 mm, such that the fibers 51 of the target component 21 and the fibers 52 of the ancillary component 22 are individually present and the intimate intertwining of the fabric 23 is broken up, i.e. the fibers 51, 52 can be separated from each other without further mechanical comminution treatment. However, the comminuted textile waste 5 may also be provided in pre-ground form, where additional comminution steps in comminution devices 3, 4 as described above are optional.

It can be further seen from FIG. 1, that the comminuted textile waste 5 is supplied to a mixing device 6, where it is mixed with an alkaline aqueous solution 7 and dispersed in it to form a suspension 8. The alkaline aqueous solution 7 is similarly fed to the mixing device 6 through a suitable dispenser 10. The aqueous solution 7 contains water 71 and an alkali hydroxide 72 (for example caustic soda) and preferably has a pH between 9 and 12. The suspension 8 is preferably stirred in the mixing device 6 with a stirrer 9 for approximately 20 to 40 min, to loosen up the comminuted textile waste 5 and to increase the homogeneity of the suspension 8. The cellulosic fibers 51 of the target component 21 are water swellable and have a density higher than that of water and of the ancillary component 22. Thus, the cellulosic fibers 51 are swelled in the alkaline aqueous solution 7 of the suspension 8, whereby the cellulosic fibers 51 soak up the alkaline aqueous solution 7 and their density is increased. The non-cellulosic man-made fibers 52 of the ancillary component 22 on the other hand are substantially non-swellable in the aqueous solution 7. Thus, the swelling leads to an increasing density difference between the cellulosic fibers 51 and non-cellulosic fibers 52, ensuring a reliable separation of the components 21, 22. During the swelling, the alkaline aqueous solution 7 is kept at a temperature between 5° C. and 60° C. for the swelling to be most efficient. The swelling may be further improved and accelerated if the temperature is kept between 35° C. and 55° C. In one embodiment, the mixing device 6 may be designed such that comminuted textile waste 5 and alkaline aqueous solution 7 are fed continuously into the mixing device 6. In another embodiment, the mixing device 6 may be designed such that comminuted textile waste 5 and alkaline aqueous solution 7 are added and mixed discontinuously (i.e. in a batch process).

In a further process step according to the embodiment in FIG. 1, the swelled target component fibers 51 and the ancillary component fibers 52 in the suspension 8 are separated according to their respective density through a suitable separation device 11. In the present embodiment, the separation device 11 is a hydrocyclone 12. Therefore, the suspension 8 is fed via a pump 13 into an inlet 14 of the hydrocyclone 12. In the hydrocyclone 12, the suspension 8 is separated into a high-density target fraction 81 and a low-density residual fraction 82. The density difference between the cellulosic fibers 51 and non-cellulosic fibers 52 is at least 0.15 g/mL, which can be increased significantly due to swelling, e.g. up to 0.25 g/mL or greater. In particular, the cellulosic fibers 51 of the target component 21 have a density usually greater than 1.5 g/mL and are thus predominantly separated into the high-density target fraction 81 of the suspension 8. Whereas the non-cellulosic fibers 52 of the ancillary component 22 have a density usually lower than 1.35 g/mL (for polyethylene fibers) and are thus predominantly separated into the low-density residual fraction 82 of the suspension 8. The high-density target fraction 81 leaves the hydrocyclone 12 through the bottom outlet 15 (underflow outlet) and is fed into a first tank 17. The low-density residual fraction 82 leaves the hydrocyclone 12 through the top outlet 16 (overflow outlet) and is fed into a second tank 18. Thus, the target fraction 81 in the first tank 17 is enriched with cellulosic fibers 51 of the target component 21 and the residual fraction 82 in the second tank 18 is enriched with non-cellulosic fibers 52 of the ancillary component 22. To retain the cellulosic fibers 51, the target fraction 81 may be filtered to remove the residual aqueous solution 7. With such a process 1, the removal efficiency of the ancillary component 22 in the target fraction 81 may easily be at least 30%, more particularly greater than 40%.

Figure 2:
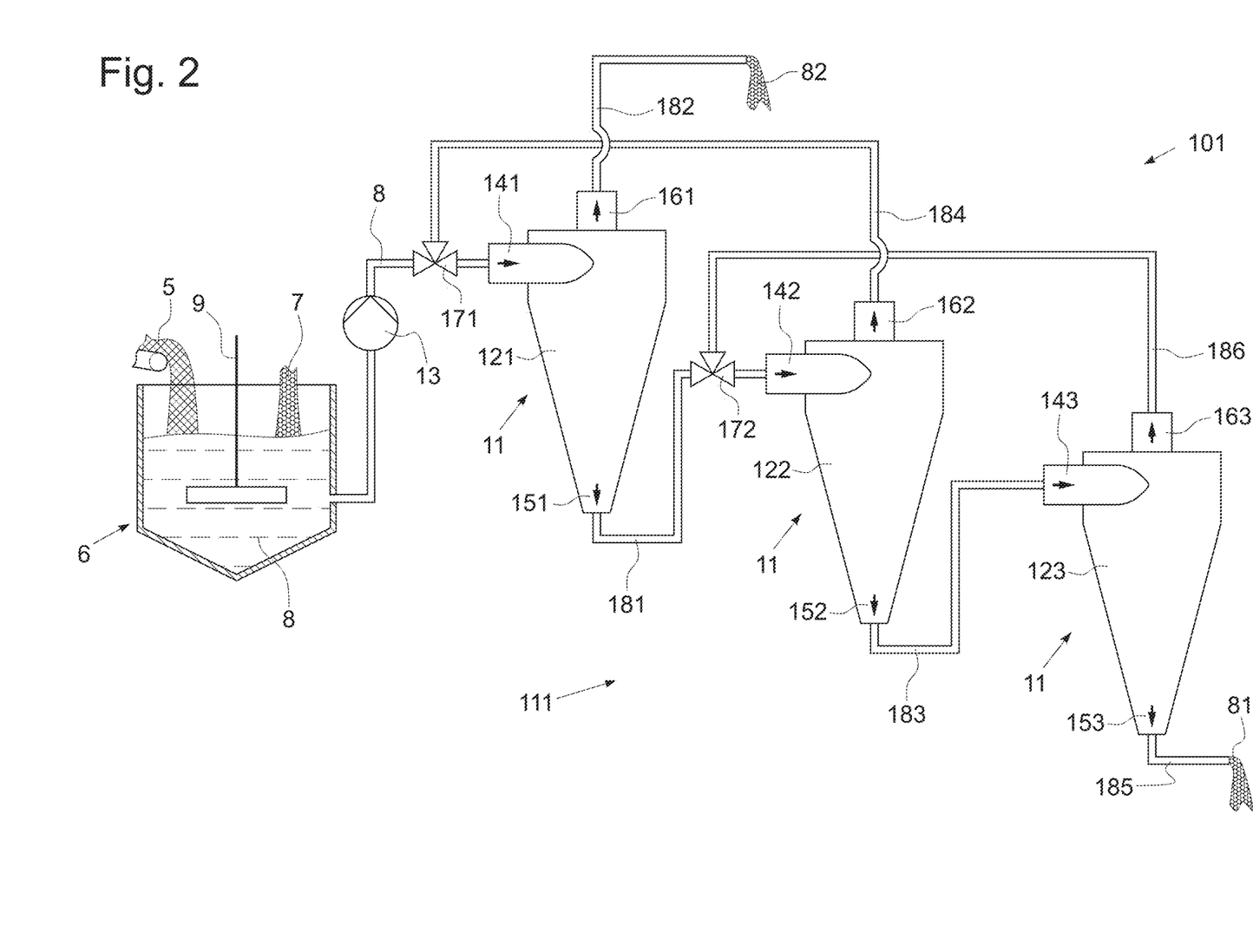
FIG. 2 shows a partially sectional schematic view of a second embodiment, where a 3-stage hydrocyclone cascade is employed as separation device.

FIG. 2 schematically depicts a process 101 according to a second embodiment of the invention. The comminuted textile waste 5, containing the target component 21 and the ancillary component 22 may be similarly prepared as depicted in FIG. 1. Equally, the comminuted textile waste 5 may be directly supplied to the process 101. As shown in FIG. 1, the target component 21, which shall be reclaimed from the textile waste 5, contains at least one cellulosic fiber 51, preferably cotton, and the ancillary component 22, which shall be rejected from the textile waste 5, contains at least one synthetic fiber 52, such as polyester or elastane.

In FIG. 2, the comminuted textile waste 5 is again supplied to a mixing device 6 and mixed with an alkaline aqueous solution 7 whereby the suspension 8 if formed. The further treatment of the components 21, 22 is identical as described above for FIG. 1.

The swelled target component fibers 51 and the ancillary component fibers 52 in the suspension 8 are then separated according to their respective density through a number of suitable separation devices 11. According to the embodiment in FIG. 2, a cascade 111 of three consecutive hydrocyclones 121, 122, 123 is employed. The suspension 8 is fed via a pump 13 into the inlet 141 by a first three-way valve 171 of the first hydrocyclone 121. The first hydrocyclone 121 then separates the suspension 8 into a first high-density fraction 181 and a first low-density fraction 182. The first high-density fraction 181 leaves the first hydrocyclone 121 through the bottom (underflow) outlet 151 and is fed via a second three-way valve 172 into the inlet 142 of the second hydrocyclone 122. In the second hydrocyclone 122, the first high-density fraction 181 is again separated into a second high-density fraction 183 and a second low-density fraction 184, whereby the second high-density fraction 183 leaves the second hydrocyclone 122 through its bottom outlet 152 and is further fed into the inlet 143 of the third hydrocyclone 123. The third hydrocyclone 123 concludes the three-stage hydrocyclone cascade 111 by separating the second high-density fraction 183 into a third high-density fraction 185 and a third low-density fraction 186. The third high-density fraction 185, which leaves the third hydrocyclone 123 through its bottom outlet 153, forms the target fraction 81 of the separation process 101. The target fraction 81, leaving the hydrocyclone cascade 111, is enriched with cellulosic fibers 51 of the target component 21. The low-density fractions 184, 186 that leave the second and third hydrocyclones 122, 123 through their top outlets 162, 163 are fed back to the respective three-way valve 171, 172 before the input of the previous hydrocyclones 121, 122. The low-density fraction 182 from the top outlet 161 of the first hydrocyclone 121 forms the residual fraction 82, which is enriched with the non-cellulosic fibers 52 of the ancillary component 22. Such a hydrocyclone cascade 111 is able to obtain a higher removal efficiency of the ancillary component 22, leading to a more reliable process 101. Finally, after separation, the target fraction 81 and the residual fraction 82 may be filtered to remove the aqueous solution 7. Additionally, between the connected bottom outlets 151, 152 and inlets 142, 143 of the hydrocyclones 121, 122, 123, pumps or means for conditioning the suspensions 181, 182 may be employed to adjust the content of solids in the respective suspension 181, 182, which is not further depicted in the figures.

Figure 3:
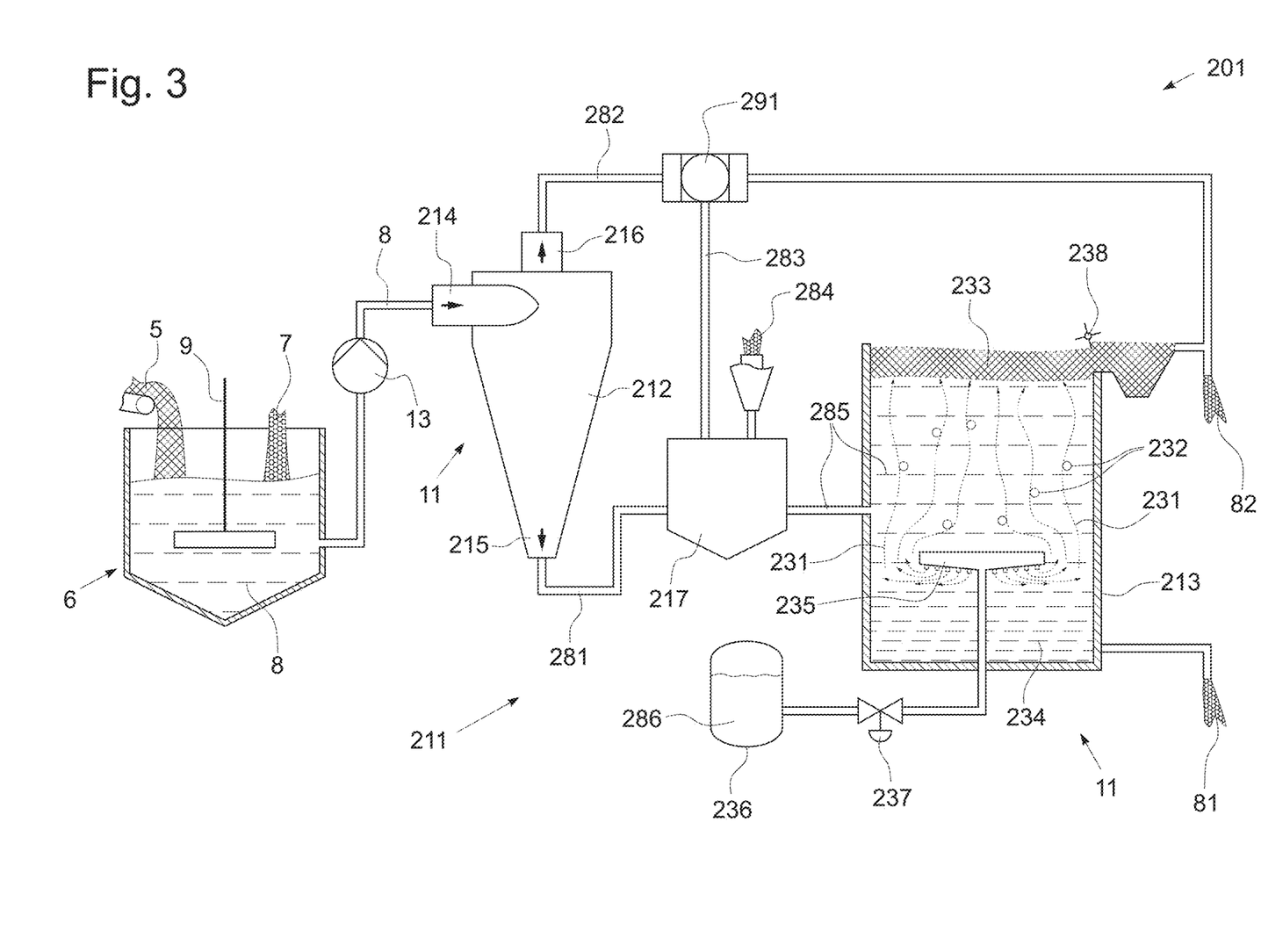
FIG. 3 shows a partially sectional schematic view of a third embodiment, where a hydrocyclone separation is consecutively followed by a flotation.

FIG. 3 depicts a process 201 according to a third embodiment of the invention. Again, as described for FIGS. 1 and 2, the comminuted textile waste 5, containing the target component 21, with at least one cellulosic fiber 51, and the ancillary component 22, with at least one synthetic fiber 52, may be prepared and fed into the mixing device 6 accordingly, where it is mixed with an alkaline aqueous solution 7, forming the suspension 8. The swelled target component fibers 51 and the ancillary component fibers 52 in the suspension 8 are then separated in two consecutive separation devices 11, namely a hydrocyclone 212 and a flotation cell 213. In the combined hydrocyclone-flotation separator 211, the suspension 8 is first pumped via a pump 13 into the inlet 214 of the hydrocyclone 212. Therein the suspension 8 is separated into a first high-density fraction 281 and a first low-density fraction 282. The first high-density fraction 281 leaves the first hydrocyclone 212 through its bottom outlet 215 and is fed into a conditioner 217 prior to feeding into the flotation cell 213. The first low-density fraction 282 leaves the hydrocyclone 212 through its top outlet 216 and is passed through a filter 291 to partially reclaim a suspension 283, which is also supplied to the conditioner 217. In the conditioner 217, a part of the reclaimed suspension 283 is mixed with the first high-density fraction 281 and an additional flotation agent 284, to improve the separation of the components 21, 22 in the flotation cell 213. The conditioner 217 also helps to adjust the solid particle content of the high-density fraction 281 to achieve an ideal input consistency for the separation in the flotation cell 213. The flotation agent 284 may be a coagulant (such as ferric chloride or aluminum sulfate) to coagulate the particles and/or a flocculant to conglomerate the particles into bigger clusters, which improves the flotation efficiency. The conditioned suspension 285 is then fed into the flotation cell 213, wherein air 231 is introduced into the flotation cell 213 through an aerating device 235 and forms bubbles 232 at nucleation sites on the surface of the fibers 51, 52 of the suspended components 21, 22. The air 231 is introduced into the suspension 285 in the form of air-pressurized water 286, which is stored in a pressurizer 236 and fed into the flotation cell 213 through the aerating device 235. A pressure reduction valve 237 may limit the amount of pressurized water 286 flowing from the pressurizer 236 into the flotation cell 213. Upon entering the suspension 285, the pressurized water 286 releases the air 231 in form of air bubbles 231 to the suspension 285. The air bubbles 231 adhere to the fibers 51, 52, resulting in a separation of the suspension 285, where the low-density fibers 52 float to the surface and form a froth layer 233 on top of the suspension 285. The high-density fibers 51 on the other hand are too heavy to be lifted by the air bubbles 232 and sink to the bottom, where they form a sediment 234. Due to the swelling of the target component fibers 51 in the alkaline aqueous solution 7 and their resulting increase in density, a reliable separation may be achieved. The selectivity and effectiveness of the separation however depends on several parameters, such as amount of air 231 introduced into the flotation cell 213, as well as the flotation agents 284 added to the suspension 285, so the flotation may be specifically adjusted depending on the components 21, 22 that need to be separated. The froth 233 formed on top of the suspension 285 is removed via a skimmer 238 and is joined with the first low-density fraction 282 to form the low-density residual fraction 82, enriched with the ancillary component 22 (i.e. the polyester fibers 52). The sediment 234 is ejected at the bottom of the flotation cell 213 and forms the high-density target fraction 81, which is enriched with the target component 21 (i.e. the cotton fibers 51). After the separation, the target fraction 81 and the residual fraction 82 may be filtered to remove the aqueous solution 7.

In all above shown embodiments according to FIGS. 1 to 3, the target fraction 81 and the residual fraction 82 may be subsequently filtered to at least partially remove the aqueous solution 7, which is not further depicted in the figures. Thereby, the filtered aqueous solution 7 may be recycled and reused to form a closed-loop recycling process with a minimal ecological footprint. Additionally, the filtered aqueous solution may be used in several process stages (e.g. between subsequent separation devices (11) to adjust the consistency of the input suspensions, which has not been shown in the figures.

EXAMPLES

In the following, the invention is demonstrated according to examples 1 to 4. The results are summarized in Table 1.

In each of examples 1 to 3, 40 kg of post-consumer textile waste, comprising cotton fibers as target component and polyester (PET) fibers as ancillary component (cotton fiber content 70%, PET fiber content 30%), were cut on a Pierret N40 guillotine in 1×1 cm$^2$ pieces and afterwards grinded on a Herbold SF 26/41 cutting mill with a 3 mm round mesh. The comminuted textile waste was then dispersed in an aqueous solution, followed by subsequent addition of 0.2% Lucramul® WT 200 (non-ionic wetting agent) by weight. In examples 1 to 3, 960 kg of an alkaline aqueous solution with a pH of 10 was used (obtained by addition of aqueous NaOH). The mixture (in total 1000 kg) was then stirred for 30 min at a temperature of 55° C. to obtain a homogeneous suspension and to accelerate the swelling of the cellulosic fibers. Example 4 shows a comparative example with no pH adjustment (neutral aqueous solution).

Example 1

In example 1, according to the aforementioned procedure, 40 kg of textile waste (70% cotton and 30% PET content) were dispersed in 960 kg of alkaline aqueous solution and the resulting suspension was pumped to a single hydrocyclone (e.g. Radiclone BM80-1), i.e. the suspension contained 4% textile waste by weight and had a pH of 10, and the suspension was subsequently separated into a target fraction and a residual fraction. The target fraction was reclaimed from the underflow (bottom) outlet of the hydrocyclone, whereas the residual fraction was separated from the input stream via the overflow (top) outlet.

The following results could be obtained with this setup: after separation, the target fraction contained 19.4% of PET fibers by weight (of fibers) and % cotton fibers by weight (of fibers). The resulting target fraction thereby contained 3.9% fibers. 13.0% of the textile waste was rejected to the residual fraction and 3.5% of the initial cotton component was lost to the residual fraction. The resulting removal efficiency of the PET component was 46.5%.

Example 2

In example 2, 40 kg of textile waste (70% cotton and 30% PET content) were dispersed in 960 kg alkaline aqueous solution (pH 10, 4% of textile waste by weight of fibers).

Other than in example 1, the resulting suspension was pumped to a 5-stage hydrocyclone cascade (Radiclone BM80-1), whereby the underflow outlet of the first hydrocyclone stage was used as input for the second hydrocyclone stage, and so forth. The target fraction was reclaimed from the underflow outlet of the fifth hydrocyclone stage and the residual fraction was collected from the overflow outlets of all subsequent hydrocyclone stages.

The following results could be obtained with this setup: after separation, the target fraction contained 10.1% of PET fibers by weight and 89.9% cotton fibers by weight. The resulting target fraction thereby contained 3.6% fibers. % of the textile waste was rejected to the residual fraction and 3.1% of the initial cotton component was lost to the residual fraction. The resulting removal efficiency of the PET component was 73.9%.

Example 3

In example 3, equally, 40 kg of textile waste (70% cotton and 30% PET content) were dispersed in 960 kg alkaline aqueous solution (pH 10, 4% of textile waste by weight). Therein, the resulting suspension was pumped to a 3-stage hydrocyclone cascade (Radiclone BM80-1), followed by a dissolved air flotation (DAF) treatment. Hence the suspension was supplied to the 3-stage hydrocyclone and the underflow outlet stream was subjected to the flotation. The target fraction thus was reclaimed from the flotation output (bottom sediment) and the residual fraction was collected from the overflow outlet of the hydrocyclone stage as well as from the reject (froth layer) of the flotation.

The following results could be obtained regarding example 3: after flotation, the target fraction contained 12.3% of PET fibers by weight and 87.7% cotton fibers by weight. The target fraction had a solid fiber content of 3.7%. In total, 14.9% of the textile waste was rejected to the residual fraction and 3.1% of the initial cotton component was lost to the residual fraction. The resulting removal efficiency of the PET component was 67.6%.

Example 4

Example 4 shows a comparative example for example 1, where the textile waste was not treated in an alkaline aqueous solution. Instead, the 40 kg of textile waste (70% cotton and 30% PET content) were dispersed in 960 kg aqueous solution (water) without adjustment of the pH value. The resulting suspension was again pumped to a single hydrocyclone (e.g. Radiclone BM80-1), whereby the suspension contained 4% textile waste by weight. The suspension was separated into a target fraction and a residual fraction. The target fraction was reclaimed from the underflow outlet of the hydrocyclone, whereas the residual fraction was separated from the input stream via the overflow outlet.

The following results could be obtained with this setup: after separation, the target fraction contained 29.1% of PET fibers by weight and 70.9% cotton fibers by weight. The resulting target fraction thereby contained 4.0% fibers. 2.9% of the textile waste was rejected to the residual fraction and 3.0% of the initial cotton component was lost to the residual fraction. The resulting removal efficiency of the PET component was only 5.0%, which is significantly less than in example 1, where the cotton component was swollen in an alkaline solution prior to separation.

TABLE 1

| | Example 1 | Example 2 | Example 3 | Example 4 |
|---|---|---|---|---|
| Separation method | single hydro-cyclone | 5-stage hydro-cyclone | 3-stage hydro-cyclone + flotation | single hydro-cyclone |
| Solution pH [pH] | 10 | 10 | 10 | — |
| PET removal efficiency [%] | 46.5% | 73.9% | 67.6% | 5.0% |
| Cotton loss [%] | 3.5% | 3.1% | 3.1% | 3.0% |
| Total fiber mass loss [%] | 13.0% | 15.6% | 14.9% | 3.0% |
| Target fraction: | | | | |
| Total mass [kg] | 870.0 kg | 844.1 kg | 850.6 kg | 970.1 kg |
| Fiber content [wt.-%] | 3.8% | 3.6% | 3.7% | 4.0% |
| Cotton content [wt.-% of fibers] (target component) | 80.6% | 89.9% | 87.7% | 70.9% |
| PET content [wt.-% of fibers] (ancillary component) | 19.4% | 10.1% | 12.3% | 29.1% |
| Residual fraction: | | | | |
| Total mass [kg] | 130 kg | 155.9 kg | 149.4 kg | 29.9 kg |
| Fiber content [wt.-%] | 5.0% | 6.2% | 5.9% | 4.8% |
| Cotton content [wt.-% of fibers] (target component) | 15.4% | 9.1% | 9.8% | 58.8% |
| PET content [wt.-% of fibers] (ancillary component) | 84.6% | 90.9% | 90.2% | 41.2% |

The invention claimed is:

1. A process for separating a fibrous target component from textile waste, said textile waste containing the target component and at least one ancillary component, wherein the target component comprises water-swellable textile fibers with a density higher than the density of water, the process comprising the steps:
    a) dispersing a comminuted textile waste in an alkaline aqueous solution to obtain a suspension containing the textile waste, and
    b) separating the dispersed textile waste from the suspension into a high-density target fraction comprising the target component and a low-density residual fraction comprising the at least one ancillary component, according to a respective density of the target component and the at least one ancillary component,
    wherein the water-swellable textile fibers are swelled in the alkaline aqueous solution prior to step b), thereby increasing a density and weight of said target component relative to a density and weight of the at least one ancillary component.

2. The process according to claim 1, wherein the water-swellable textile fibers are cellulosic fibers.

3. The process according to claim 1, wherein the at least one ancillary component comprises substantially non-water-swellable textile fibers with a density lower than the density of the water-swellable textile fibers.

4. The process according to claim 1, wherein the water-swellable textile fibers are swelled in the alkaline aqueous solution with a pH between 9 and 12.

5. The process according to claim 1, wherein the water-swellable textile fibers are swelled in the alkaline aqueous solution until the difference in density between the target component and the at least one ancillary component is higher than 0.15 g/mL.

6. The process according to claim 1, wherein the water-swellable textile fibers are swelled in the alkaline aqueous solution at a temperature between 5° C. and 60° C.

7. The process according to claim 1, wherein the dispersed textile waste is separated according to the respective density of the target component and the at least one ancillary component, such that a removal efficiency of the at least one ancillary component in the high-density target fraction is at least 30%.

8. The process according to claim 1, wherein the dispersed textile waste is separated in step b) via at least one mechanical separation device.

9. The process according to claim 1, wherein a surfactant agent is added to the alkaline aqueous solution to improve dispersion of the textile waste.

10. The process according to claim 2, wherein the water-swellable textile fibers are regenerated cellulose fibers.

11. The process according to claim 3, wherein the non-water-swellable textile fibers are synthetic non-cellulosic fibers.

12. The process according to claim 4, wherein the alkaline aqueous solution comprises an alkali hydroxide.

13. The process according to claim 5, wherein difference in density between the target component and the at least one ancillary component is higher than 0.25 g/mL.

14. The process according to claim 6, wherein the water-swellable textile fibers are swelled in the alkaline aqueous solution at a temperature between 35° C. and 55° C.

15. The process according to claim 7, wherein the removal efficiency of the at least one ancillary component in the high-density target fraction is at least 40%.

16. The process according to claim 8, wherein the at least one mechanical separation device is a hydrocyclone, a hydrocyclone-cascade, a hydrocyclone followed by a flotation cell or a hydrocyclone-cascade followed by a flotation cell.

17. The process according to claim 9, wherein the surfactant agent is a non-ionic tenside.

18. The process according to claim 9, wherein the surfactant agent is added to the alkaline aqueous solution in a concentration ≤2% by weight.

19. The process of claim 1, wherein pulping cellulose based raw material from the textile waste produces a dissolving pulp.

20. The process of claim 19, wherein a target fraction containing a fibrous textile component is separated from the textile waste and the target fraction is subjected to an alkaline cooking process to remove contaminants to obtain the dissolving pulp.

21. The process of claim 20, wherein the alkaline aqueous solution is not separated from the target fraction before subjecting the target fraction to the alkaline cooking process.

22. The process of claim 19, wherein the dissolving pulp obtained is washed and bleached.

23. The process of claim 1, wherein cellulosic molded bodies are produced from the textile waste.

24. The process of claim 23, wherein a dissolving pulp from the textile waste is obtained and dissolved to form a spinning solution, wherein the spinning solution is extruded through a spinneret and precipitate in a spin bath to obtain the cellulosic molded bodies.

25. The process of claim 24, wherein the spinning solution comprises water and a tertiary amine oxide.

* * * * *